Nov. 21, 1950      W. B. STODDARD, JR      2,530,552
SOLDERING METHOD FOR POSITIONING STRIP MATERIAL
Filed Jan. 8, 1946      3 Sheets-Sheet 1

INVENTOR
William B. Stoddard, Jr.
BY
Frederick G. L. Boyer
ATTORNEY

Nov. 21, 1950     W. B. STODDARD, JR     2,530,552
SOLDERING METHOD FOR POSITIONING STRIP MATERIAL
Filed Jan. 8, 1946     3 Sheets-Sheet 2

INVENTOR
William B. Stoddard Jr.
BY Frederick G. L. Boyer
ATTORNEY

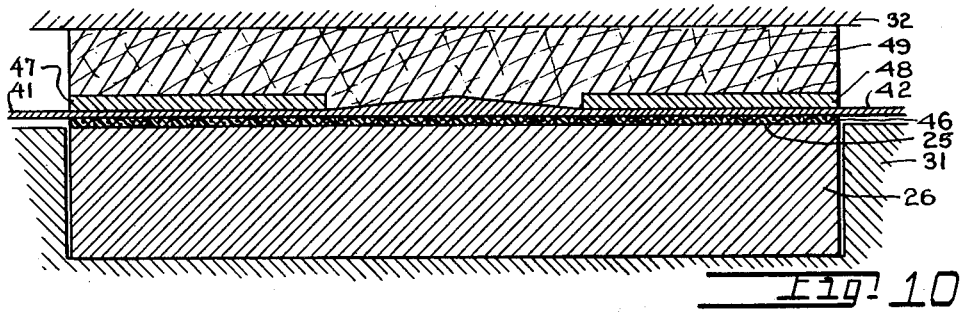
Fig. 10
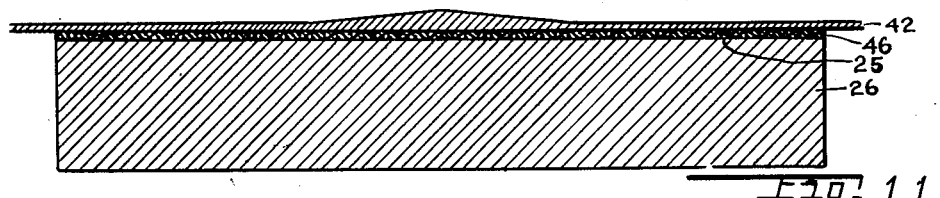
Fig. 11
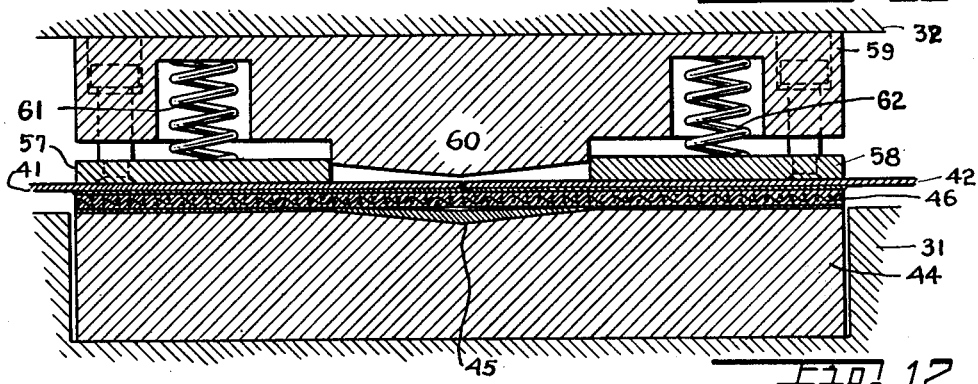
Fig. 12
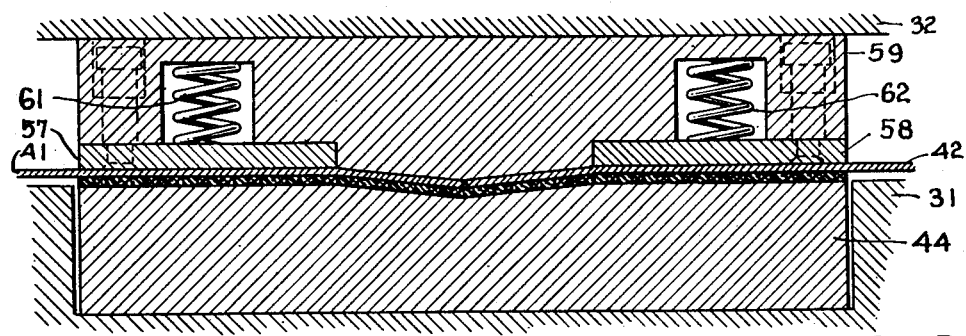
Fig. 13
Fig. 14    Fig. 15

Patented Nov. 21, 1950

2,530,552

UNITED STATES PATENT OFFICE 2,530,552

SOLDERING METHOD FOR POSITIONING STRIP MATERIAL

William B. Stoddard, Jr., Hamilton, Ohio, assignor to The Champion Paper and Fibre Company, Hamilton, Ohio, a corporation of Ohio Application January 8, 1946, Serial No. 639,868

8 Claims. (Cl. 113—59)

This invention relates to soldering methods and to soldered joints made thereby. It primarily concerns the joining of more or less extensive surfaces so that they will be firmly attached and accurately parallel. It has particular reference to methods by which thin or sheet metal may be soldered to a metal surface, more especially to a relatively rigid metallic surface whereby it may be firmly fastened thereto and accurately conform to the surface thereof to give, for example, a substantially perfectly plane surface when the rigid surface is an accurately formed and smooth plane surface. It has a particular field of utility in connection with processes of making electrolytic welds in sheet metal, in which processes the present invention provides a superior method of holding the sheet metal parts accurately in their proper relative positions during the welding operation. The term "electrolytic weld" as used herein designates a joint or weld uniting two pieces of metal, wherein the weld metal which joins them has been electrolytically deposited on and/or between and electrolytically bonded to the portions joined together.

When in making electrolytic welds in sheet metal it is desired to form a joint which shall be substantially indistinguishable from the surrounding sheet metal, it is necessary that the two edges to be joined shall be firmly held accurately flat and in the same plane during the welding operation. A departure of less than 1/1000 inch from flatness in either piece or from coincidence with the plane of the other is frequently sufficient to cause objectionable variations in thickness or in continuity of surface of the welded sheet.

For such exacting purposes it has been found that the usual methods of soldering are incapable of giving the required combination of adhesion and flatness, no matter how accurately smooth and flat the base surface to which the sheet be soldered. It has been found that for one reason or another when using known methods of soldering, the thickness of the solder layer between the sheet and the base surface always lacks uniformity and the surface of the soldered sheet consequently lacks the necessary flatness. It was thought that by applying sufficient pressure by means of a flat and rigid surface to the sheet metal during the soldering operation, it could be forced into conformity with the flat base surface. This improves the flatness, but it has been found to invariably result in such poor adherence that the method cannot be used successfully.

The primary object of the present invention is, therefore, to provide a method of making firm soldered joints between two more or less extensive metallic surfaces, for holding said surfaces in accurate parallelism. A second object is to provide a method of soldering sheet metal firmly and accurately parallel to another surface, more especially to the surface of a relatively rigid base, whereby the surface of the sheet metal after soldering will accurately conform to the plane (or otherwise formed) surface of the rigid base. An allied object of the invention is to provide an accurate and satisfactory method of holding sheet metal during an electrolytic welding operation. A further object is to provide a joint for holding two more or less extensive surfaces firmly together and accurately parallel. Another object of the invention is to provide a strong soldered joint for holding sheet metal to and in accurate parallelism with the surface of another piece of metal. Other objects and advantages of the invention will become apparent from the following description.

I have found that the objects of the invention can be accomplished, the difficulties described can be avoided, and two surfaces soldered together firmly and accurately parallel by placing a reticular member such as wire cloth or the like, with the solder and flux, between the two surfaces to be joined, heating all to a temperature above the melting point of the solder and then pressing them together under sufficient pressure to squeeze out excess solder, so that the distance between the two surfaces is determined by the thickness of the wire cloth. It is thought that under these conditions the knuckles on the wire cloth are substantially in contact with both surfaces and that the solder which holds them together is that which is located in the interstices between the wires.

The invention will be particularly described, by way of example, as applied to the fastening of sheet metal onto a relatively rigid base, though it will be understood that it may be similarly applied to the fastening together of sheets or of rigid parts having either plane or curved surfaces which fit together properly.

For the purposes of this description, reference will be made to the accompanying drawings, in which:

Fig. 10 illustrates the positions assumed by the parts shown in Fig. 9 after the application of the heavy pressure during the soldering operation.

Fig. 11 is a sectional view of the completed soldered joint ready for the removal of the excess metal from the weld.

Fig. 12 is a sectional view similar to Fig. 6 but showing an alternative form of device for the application of pressure in the soldering operation.

Fig. 13 illustrates the positions assumed by the parts shown in Fig. 12 after the application of the heavy pressure during the soldering operation.

Figs. 14 and 15 show in plan and section respectively, an alternative form of surface on the heavy metal block as a substitute for the wire cloth.

Fig. 18 is a greatly enlarged sectional view of a small portion of the soldered joint as illustrated in Fig. 5, showing the wire cloth interposed, with the solder, between the sheet metal and the surface to which it is soldered.

All of the figures, it should be noted, are drawn to a more or less distorted scale in order to more clearly show the solder, wire cloth, etc.

Figure 1:
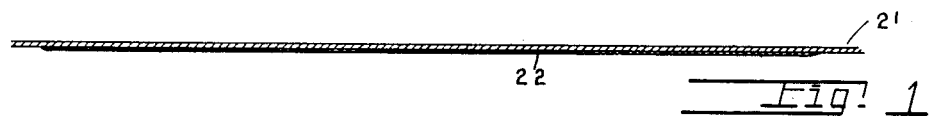
Fig. 1 is a cross section of the sheet metal after tinning but before assembly preparatory to the soldering operation.
Figure 2:
Fig. 2 is a section of the wire cloth after tinning and before assembly preparatory to the soldering operation.
Figure 3:
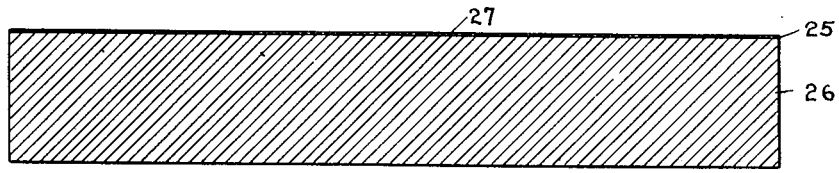
Fig. 3 is a section of the relatively heavy block of metal after tinning but before assembly preparatory to the soldering operation.
Figure 4:
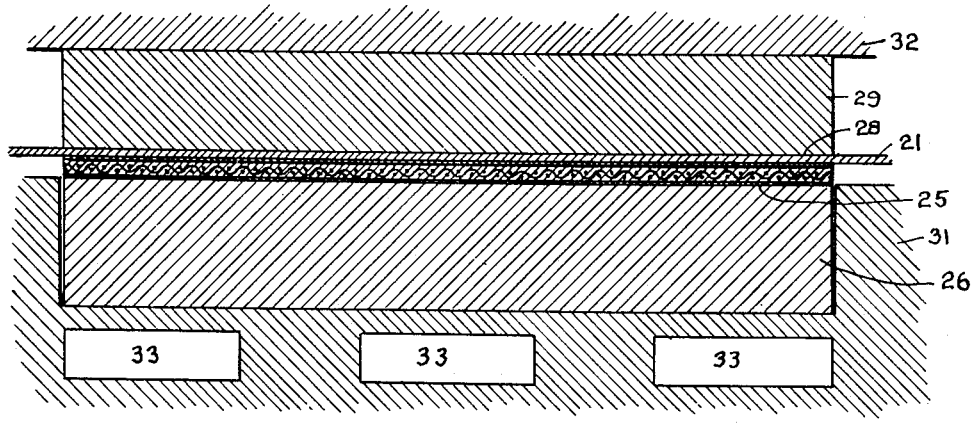
Fig. 4 is a section showing these parts assembled and in place in a press ready for the beginning of the soldering operation.
Figure 5:
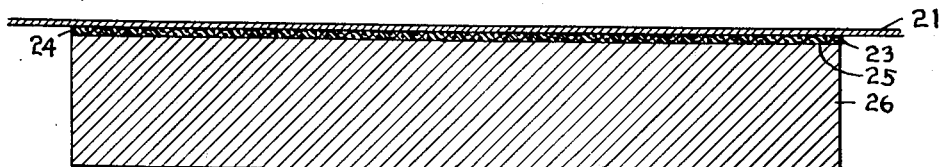
Fig. 5 is a sectional view of the completed soldered joint.
Figure 1B:
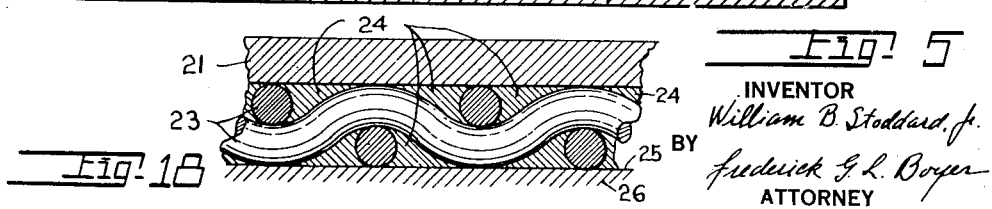

Referring to the drawings, the sheet metal 21 is thoroughly cleaned and may, if desired, be "tinned" or coated with a layer of solder 22 over the entire area of the proposed solder joint. A piece of wire cloth 23 is also tinned, substantially filling the meshes with solder as at 24. The smooth flat surface 25 of the heavy metal block 26 to which the sheet metal is to be soldered is also tinned with a thin layer 27 of solder. These parts together with a suitable flux are then placed together as shown in Fig. 4, the smooth flat surface 28 of a metal plate 29 is placed over and in contact with the carefully cleaned surface of metal sheet 21. This assembly is placed between the jaws 31 and 32 of a hydraulic press or other suitable pressure device, and sufficient pressure is applied to hold the parts firmly in position. By the use of heating means of any desired type such as for example electric heating elements 33, the entire assembly is heated to a temperature above the melting point of the solder. When the solder is completely melted, the pressure on the assembly is increased if necessary to a degree sufficient to squeeze out the excess solder until the sheet metal 21 and the block 26 are substantially in contact with the upper and lower "knuckles" respectively, of the wire cloth, as clearly illustrated in Fig. 18. The pressure required to accomplish this result depends upon the thickness, flatness and stiffness of the sheet metal, on the mesh of the wire cloth, the fluidity of the solder, etc. but can readily be determined when the requirements are understood. After the excess solder has been pressed out of the joint, the assembly is held under pressure and cooled until the solder is completely solidified, and the completed soldered joint is then removed from the press. It then appears as illustrated in Figs. 5 and 18 with the solder 24, between the meshes of the wire cloth, bonded to the sheet metal 21 above and the surface 25 of block 26 below.

The upper surface 25 of block 26, and the lower surface 28 of block 29, are smooth and flat, and the sheet metal 21 and wire cloth 23, if of suitable quality, are of substantially uniform thickness throughout. Before use, the metal cloth may if desired be polished down on the two sides to insure the required uniformity of thickness and incidentally to remove the sharpness of the knuckles. After the solder is fused and the pressure is applied, therefore, the distance between the sheet and the block is determined by the thickness of the wire cloth and is substantially uniform throughout and the upper surface of the sheet metal 21 is substantially accurately flat and parallel to the upper surface 25 of the block 26. The solder has not been squeezed out by the pressure used but remains in the interstices between the wires forming the cloth as shown at 24 in Fig. 18. The adhesion is found to be strong over the entire area of the surface, in marked contrast to a joint soldered in a similar manner without the interposed wire cloth.

Figure 6:
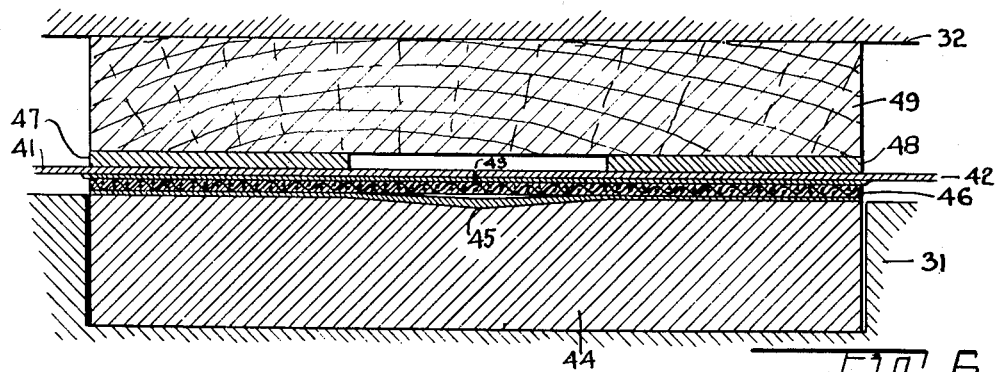
Fig. 6 is a sectional view similar to Fig. 4 but showing the parts assembled in a press ready for the soldering of two pieces of sheet metal to a single heavy block of metal in preparation for an electrolytic welding operation.
Figure 7:
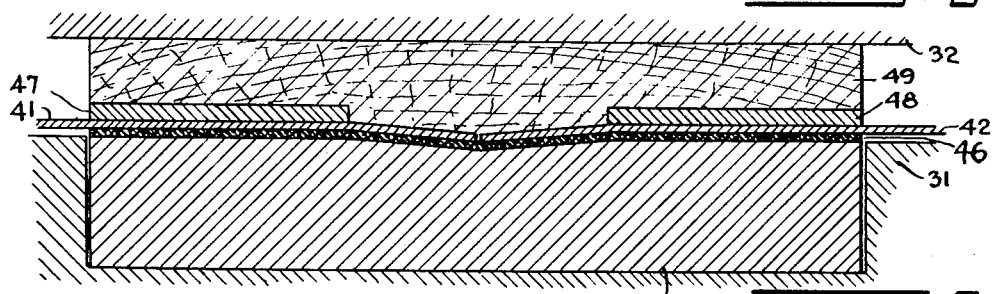
Fig. 7 illustrates the positions assumed by the parts shown in Fig. 6 after the application of the heavy pressure during the soldering operation.
Figure 8:
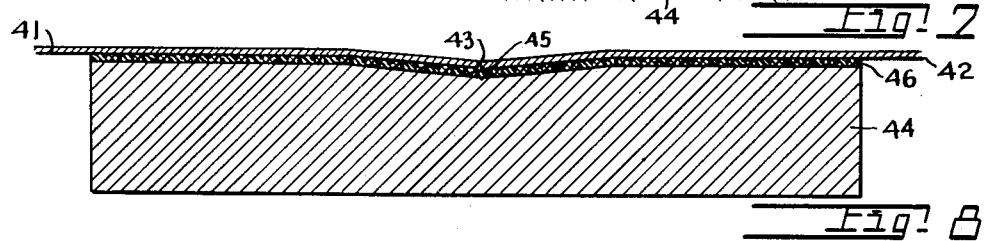
Fig. 8 is a sectional view of the completed soldered joint resulting from the operations illustrated in Figs. 6 and 7, and ready for an electrolytic welding operation.

When the soldering is to be done in preparation for the operation of electrolytically welding together the edges of two pieces of sheet metal, it is only necessary to abut the two edges at the center of the plate 26 and perform the soldering operation as described. It is, however, sometimes desired in the electrolytic welding operation to have the abutted edges displaced from the plane of the sheets so that the weld metal is deposited in that plane. In such case, the soldering may be accomplished as illustrated in Figs. 6 to 8.

In this case the pieces of sheet metal to be welded, designated as 41 and 42, are abutted with not more than a slight clearance at 43. The base block 44 has a, usually V-shaped, groove or depression 45 over the deepest part of which the sheets are abutted at 43. The depth of this groove can be made to suit but is usually from two to four times the thickness of the sheets to be joined. The width of this groove may also be varied as desired but the slope of the sides is usually quite small and the V quite flat. The lower surfaces of the sheet metal pieces 41 and 42, the upper surface of the block 44, and the wire cloth 46 are tinned as in the case described, and then assembled as illustrated in Fig. 6. Over the groove 45 where the weld is to be made, a free space is left, but beyond the edges of the weld the two sheets are usually required to be in the same plane and at these locations smooth plane surfaced metal blocks 47 and 48 are placed on the upper surface of the metal sheets 41 and 42 respectively. Over these is placed a block 49 of wood or other deformable material. This assembly is then placed under light to moderate pressure between the jaws 31 and 32 of the pressure device in order to hold the parts in the proper position. The assembly is then heated to melt the solder as in the previous instance. When the solder is melted and the increased pressure is applied to squeeze out the excess solder, the block 49 is deformed, as shown in Fig. 7. This bends the edges of sheets 41 and 42 (if not preformed with the desired bend) down into the groove 45 so that the surfaces of the sheets 41 and 42 accurately parallel the surface of plate 44. The assembly is then cooled under pressure to solidify the solder, and removed from the press. The resulting finished joint has the form illustrated in Fig. 8. The parts of the sheets 41 and 42 beyond the V notch are smooth and flat and lie accurately in the same plane, and the adherence is firm throughout the entire area, so that when they are electrolytically welded and the excess weld metal is dressed off, the two will form, in effect, a single sheet with an uninterrupted plane surface.

Figure 9:
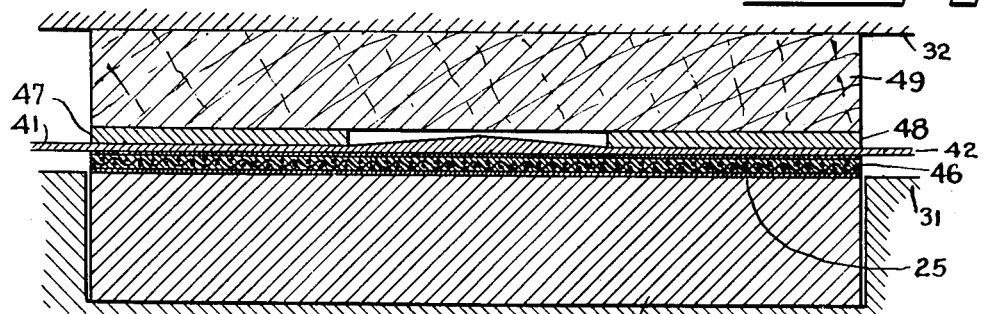
Fig. 9 is a sectional view similar to Figs. 4 and 6 showing the parts in position in a press ready for soldering the flat surface of an electrolytically welded joint to a heavy metal block in preparation for grinding the weld down to the thickness of the sheet metal.

After the weld has been made, the upper surface dressed down to the plane of the surface of the sheets, and the welded structure removed from block 44, it may be desired to hold the welded sheets firmly in position and accurately flat while the other side is ground down. For this purpose the flat surface may be soldered to the surface 25 of the flat block 26, in the manner hereinbefore described, as shown in Figs. 9 to 11. Beyond the thick portions of the weld the smooth plane surfaced metal blocks 47 and 48 are used as in the previously described example. The wooden block 49 also serves as before described and, under the high pressure applied after the solder is melted, it deforms as shown in Fig. 10 and exerts substantially uniform pressure at all points between the blocks 47 and 48 so that the flat ground surface of the weld, as well as the flat surface of the sheets beyond the weld, lies on the wire cloth and is accurately parallel to the flat surface 25 of the block 26. After it has been cooled to solidify the solder, and removed from the press, the soldered joint has the appearance illustrated in Fig. 11. It is then held firmly so that the weld can be dressed down to the level of the surrounding surface, and the surface rendered accurately flat and parallel to the other surface of the welded sheet, whereby the two sheets have been made into a single sheet of substantially uniform thickness throughout.

Instead of depending on the deformation of a block of wood or other yielding material to give the required pressure in the depression 45 (or over other desired departures from a truly plane surface) it is possible to use a rigid die which can be pressed into the required parallelism with the surface of the block 44. This alternative is illustrated in Figs. 12 and 13. The sheets 41 and 42, the upper surface of the block 44 with groove 45, and the wire cloth 46 are all tinned as in the previous example. Instead of the blocks 47 and 48, blocks 57 and 58 are substituted, and in place of the wood block 49 is the metal block 59 with die head 60 which is shaped to correspond with the groove 45. In order to hold the assembly together prior to the application of the heavy pressure, suitable springs 61 and 62 are provided which exert the necessary pressure on blocks 57 and 58. After the solder has been melted, heavy pressure is applied as before. This compresses springs 61 and 62 still further so that blocks 57, 58, and 59 with die head 60 become in effect a single block whose lower surface accurately parallels the upper surface of the block 44 and forces the upper surfaces of sheets 41 and 42 into accurate parallelism with the upper surface of block 44 so that when the assembly is cooled and the solder solidified the sheets will be firmly held in that position, as illustrated in Fig. 8.

Figures 16, 17:
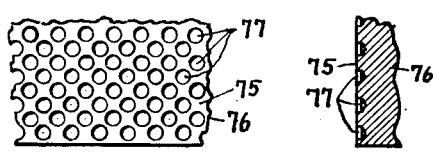
Figs. 16 and 17 show in plan and section respectively, another alternative form of surface on the heavy metal block as a substitute for the wire cloth.

Instead of depending on the interposition of wire cloth or other reticular member to provide reservoirs for sufficient solder to hold the sheet metal onto the heavier block, it is possible to provide the reservoirs in the surface of the block itself. One form of surface provided with such reservoirs is illustrated in Figs. 14 and 15. In this case the smooth surface 65 of the block 66 is provided with closely spaced longitudinal and transverse grooves 67 and 68 respectively, which form reservoirs from which the solder cannot be pressed out by any degree of pressure applied in the manner described. Between these grooves are the lands 69 whose surfaces are in the required plane and serve to positively position the sheet metal. A different form of solder reservoir is shown in Figs. 16 and 17. In this case the otherwise plane surface 75 of block 76 is broken by closely spaced depressions or pits 77.

Although these structures can be used, I ordinarily find the wire cloth to be more convenient and desirable. The cloth may be made of any suitable metal. If made of brass or bronze it should not be too fine since bronze cloth as fine as 200 mesh has been known to be completely dissolved in the solder during the operation. In using brass or bronze wire cloth I therefore prefer that it be made of wire not less than about 0.002 or 0.003 inch thick. On the other hand, it is desirable that the cloth should not be so coarse, relative to the thickness of the sheet metal to be soldered, that excessive bridging of the sheet metal is required between the knuckles in the wire cloth. In other words, the spacing of the wires in the cloth should not be great relative to the thickness of the sheet metal.

Some metal parts, such as cold worked metals and metal sheets, are subject to warpage and deterioration of physical properties if overheated. Consequently when soldering such parts, care must be taken to prevent overheating, and solder of suitably low melting point should accordingly be chosen.

I have spoken of solder throughout this specification, and by this term I mean to include suitable substantially pure metals such as lead or tin as well as solder, commonly so-called, and other fusible alloys and fusible or thermoplastic compositions which serve the same purpose.

Throughout the process, particularly when it is used to hold sheets in place for an electrolytic welding operation, care should be taken to avoid plastic and elastic deformation of and shrinkage stresses in the parts, particularly compressive stresses in sheets to be welded, after they have been soldered and cooled. Plastic distortion is that caused by stresses beyond the elastic limit, such as may be caused by too great a change of temperature, and consequent expansion, per unit of distance through the metal. It is therefore desirable that there be no rapid temperature gradient through the metal at any point at any time during the process. Elastic distortion will be held in the sheets by the solder but will disappear after unsoldering if the parts have not been welded and permanently locked in their distorted forms. Such distortion may be caused by heating the strips 41, 42 only near the edges at 43 (Fig. 6). This results in the greatest expansion near these edges which accordingly become bowed out in the center, causing the space at 43 to widen out at its ends. It is therefore recommended that the sheets 41, 42 be heated to a substantially uniform temperature for a considerable distance back from the edges 43. Shrinkage stresses in the metal parts are caused by a difference in thermal expansion between block 26 or 44 and the sheets 41, 42. This difference in expansion may be caused by a too rapid heating of the block 26 or 44 so that it becomes hotter and expands more than sheets 41, 42 above it. It may also be caused by frictional resistance between the parts 41, 42 and the overlying parts which expand relatively little. Or it may be due to a difference in the coefficients of expansion of the block and the sheets if they are made of different materials. It is accordingly desirable to correlate and control these factors so that, after soldering and cooling, the sheets 41, 42 are substantially free from stress, particularly compressive stress.

The reasons for the complete inability to secure the necessary combination of parallelism and adhesion when soldering sheet metal directly onto a heavier block and for the excellent results secured when wire cloth is interposed, are imperfectly understood. However, the following factors are thought to be among those involved: Fluid solder between the surfaces does not furnish a firm or a plane base against which the flexible sheet can be pressed to give it the desired flatness. Pressure adequate to give flatness squeezes substantially all fluid solder out from between the sheet and the flat base. Dross, composed largely of the oxides which form at soldering temperatures, is not fluid and remains in irregularly distributed masses between the sheet and the flat base and prevents the desired parallelism. The dross does not adhere either to the sheet or the base and forms no bond between them. The meshes of the wire cloth form reservoirs which retain the liquid solder in spite of the heavy pressure used. Under heavy pressure the dross is forced into the meshes of the wire cloth where it no longer prevents adherence or interferes with the uniformity of the spacing between the sheet metal and the base plate.

In one example of the successful application of the invention, two edges of sheet metal were soldered to a single block as illustrated in Figs. 6 to 8, in order to hold them firmly in place during an electrolytic welding operation. The metal sheets were of hard electrolytic nickel 0.010 inch in thicknes and 30 inches in width. The base block 44 was of annealed steel one inch thick and six inches in width and 35 inches in length. The groove 45 was approximately 0.020 inch in depth and 2 inches in width. The wire cloth 46 was 60 x 70 mesh, approximately 1/64 inch thick, the knuckles being smoothed off to a slight degree. The blocks 47 and 48 were about 2 inches in width and 3/64 inch in thickness, and extended across the full width of the sheets 41, 42. The block 49 was of selected cypress 3/4 inch thick and 6 inches wide. The parts 41, 42, 44, 45, and 46 were tinned as described, with a solder composed of lead 2 parts and tin 5 parts, and laid together as illustrated in Fig. 6 after applying a suitable flux. A pressure of 50 pounds per square inch was applied to hold the parts in position, and the assembly was heated by gas flames applied to member 31, which in this case was not provided with electric heating elements, until the solder was completely fused. The pressure was then increased to a value of approximately 500 pounds per square inch. Immediately thereafter the whole was cooled while under pressure to solidify the solder and the assembly was then removed from the press. The sheets were found to be firmly bonded to the base plate and the surfaces of the sheets over the block 44 and beyond the edges of groove 45 were found to be flat and in the same plane to within 0.0002 inch.

In another case, the materials used were the same as before except that the width of the sheets 41, 42 was 72 inches instead of 30 inches, and the block 44 and wire cloth 46 were correspondingly longer than in the previous example. The surfaces of the nickel sheets were thoroughly cleaned and polished where they were to be soldered but the tinning operation thereon was omitted, while the block 44 and wire cloth 46 were tinned as before. Over the top of the sheets 41, 42 was placed a nickel sheet about 0.002 inch thick, 6 inches wide, and over 72 inches long—completely covering the area where the pressure was to be applied. Over this in place of the two strips 47, 48 was placed a single smooth sheet of soft iron approximately 3/64 inch thick, 6 inches wide, and as long as block 44. On top of this was placed the wood block 49 as before. In this case a pressure of 500 pounds per square inch was immediately applied and maintained during the heating operation and fusion of the solder. Heat was applied by electric heating elements 33 as illustrated in Fig. 4. Additional heating elements, not shown, were disposed to the right and left of the part shown in the drawing, to heat the sheets 41—42 to a substantially uniform temperature for some distance back from the area to be soldered and thereby to avoid distortion in that area. When the solder was completely fused, the pressure was increased to 750 pounds per square inch and maintained at that value during the cooling and solidification of the solder. When the parts were removed from the press, the sheets were found to be firmly bonded and accurately parallel to the surface of base plate 44 over the entire area of approximately 3 square feet. As nearly as could be determined by careful measurement, the entire areas of the parts of the surface between the V-notch 45 and the edges of block 44 were in the same plane within about 0.0002 inch.

I claim:

1. A structure temporarily holding two edges of sheet metal in position for an electrolytic welding operation, which comprises a relatively rigid metal block having a substantially V-shaped depression, of depth materially greater than the thickness of said sheet metal, extending across an otherwise smooth plane surface, solder holding the sheet metal to said surface with wire cloth embedded in the solder therebetween and determining by its thickness the distance between the sheet metal and said surface by means of substantially direct and solder-free contact between the knuckles on each side of the wire cloth and the adjacent metal surfaces, the sheet metal being so positioned with reference to said surface that the edges to be joined by welding lie substantially in the bottom of the depression.

2. Method of holding opposed edges of sheet metal in place for an electrolytic welding operation, which comprises soldering both edges under pressure to a single relatively rigid piece of metal with wire cloth interposed between the rigid metal and the sheets, said pressure being applied while the solder is in a molten condition and being sufficient in intensity to squeeze out substantially all solder from between the knuckles of the wire cloth and the adjacent metal surfaces.

3. Method of holding opposed edges of sheet metal in place for an electrolytic welding operation, which comprises soldering areas of the sheet metal adjacent and on opposite sides of the area where the welding operation is to be performed, onto smooth and coplanar areas of a single relatively rigid piece of metal by placing solder and wire cloth between said coplanar areas and the sheet metal, pressing the sheet metal thereagainst by means of smooth, plane, and hard pressure members, while the solder is in a molten condition with sufficient pressure to squeeze out substantially all solder from between the knuckles of the wire cloth and the adjacent metallic surfaces, and holding under pressure until the solder solidifies.

4. The method of claim 3, in which the edges where the weld is to be are pressed downward, out of the plane of the areas of the sheet soldered to said co-planar areas, and soldered to a wire-cloth-and-solder-covered depression in the surface of the rigid metal.

5. The method of claim 3, in which the edges where the weld is to be are pressed downward, out of the plane of the areas of the sheet soldered to said co-planar areas, and soldered to a wire-cloth-and-solder-covered depression in the surface of the rigid metal by means of a deformable pressing medium.

6. In the operation of making and dressing down welded joints in sheet metal, the method of holding the metal firmly in place while operating thereon, which comprises, soldering one surface of the metal, at and immediately adjacent the location where the work is to be performed on the opposite surface, firmly to the surface of a relatively rigid piece of metal, by interposing solder and wire cloth therebetween, holding the parts in the relative positions, in which they are to be soldered, heating to fuse the solder, then by the application of pressure, squeezing out substantially all of the solder from between the knuckles of the wire cloth, and the adjacent metal surfaces and forcing the metal into conformity with the surface of said relatively rigid piece of metal, then holding the assembly under such pressure while cooling to solidify the solder.

7. Method of holding a welded sheet of metal from which the weld protrudes on one side, while the other side is smooth and flush with the surface of the adjacent portions of the sheet, in position for mechanically removing the protruding metal down to the level of the surfaces of the adjacent portions of the sheet, which comprises: soldering said smooth surface, at and immediately adjacent the weld, to the plane surface of a relatively rigid piece of metal, by interposing solder and wire cloth between the surfaces to be soldered, holding the parts in position, heating to fuse the solder, then, by the application of pressure, squeezing out substantially all of the solder between the knuckles of the wire cloth and the adjacent metal surfaces, and forcing said sheet metal into conformity with the plane surface of said relatively rigid member, then holding the assembly under such pressure while cooling to solidify the solder.

8. Method of claim 7 wherein the portion of the sheets adjacent the weld are pressed into contact with the knuckles of the wire cloth and into conformity with the surface of the relatively rigid member by pressure applied through rigid, smooth, plane, surfaces, and wherein the welded portion is pressed into such contact and conformity by pressure applied through a yielding medium.

WILLIAM B. STODDARD, Jr.

REFERENCES CITED

The following references are of record in the file of this patent:

UNITED STATES PATENTS

| Number | Name | Date |
| --- | --- | --- |
| 1,956,233 | Braun | Apr. 24, 1934 |
| 2,061,850 | Roberts | Nov. 24, 1936 |
| 2,337,322 | Gascoigne | Dec. 21, 1943 |
| 2,375,661 | Karmazin | May 8, 1945 |